United States Patent [19]

Seaberg et al.

[11] 4,100,738

[45] Jul. 18, 1978

[54] METHOD AND APPARATUS FOR STEERING

[75] Inventors: David H. Seaberg, Davenport; Gou-Lian Kao, Bettendorf, both of Iowa

[73] Assignee: J. I. Case Company, Racine, Wis.

[21] Appl. No.: 778,409

[22] Filed: Mar. 17, 1977

[51] Int. Cl.² .................. F16D 31/00; F15B 13/09
[52] U.S. Cl. ............................. 60/327; 60/427; 60/486; 74/471 R; 180/6.48
[58] Field of Search .................. 60/327, 395, 420, 427, 60/428, 486; 74/481, 484 R, 471 R; 180/6.48

[56] References Cited

U.S. PATENT DOCUMENTS

| 2,941,609 | 6/1960 | Bowers et al. | 180/6.48 |
| 3,898,811 | 8/1975 | Seaberg | 60/421 |
| 4,031,975 | 6/1977 | Engel | 180/6.48 |

Primary Examiner—Edgar W. Geoghegan
Attorney, Agent, or Firm—Cullen, Settle, Sloman & Cantor

[57] ABSTRACT

A method and apparatus are disclosed for mechanically steering vehicles such as crawler tractors and the like or skid steer tractors, which include a pair of independently operable power sources. The apparatus includes a pair of independent first linkage systems interconnected between a single operator control lever and each respective power source to achieve equivalent power outputs from the sources upon movement of the lever. A pair of independent second linkage systems are interconnected between respective links in the first linkage system and respective throttling means. In the method, each throttling means may be operated independently of the other to achieve unequal power outputs from the two sources by virtue of the independent first and second linkage systems.

11 Claims, 5 Drawing Figures

METHOD AND APPARATUS FOR STEERING

BACKGROUND OF THE INVENTION

1. Field of the Invention

This invention relates generally to a method and apparatus for varying the output from two hydraulic power sources, and more particularly to such methods and apparatus as used to steer prime movers such as crawler tractors.

2. The Prior Art

Various types of mechanisms have been used in the prior art to regulate the power output from a pair of tandem hydraulic swash-plate type pumps supplying fluid motors driving an actuated device or vehicle. Most typically, a pair of independent hand-operated speed control levers have been used to enable steering, such as shown for example in U.S. Pat. No. 3,898,811, incorporated by reference. Other mechanisms have included a single hand-operated lever and two foot-operated steering pedals, but have also included complex hydraulics interconnected with the foot-operated pedals. These hydraulic systems have been relatively expensive and have required frequent maintenance.

Thus, a relatively inexpensive, trouble-free mechanism for use with a single operator lever and a pair of foot operated steering pedals has not been available.

SUMMARY OF THE INVENTION

The present disclosure overcomes these prior art problems in a mechanical linkage assembly which is interconnected between a single, pivotally mounted operator control lever and the displaceable output control arms of a pair of tandem hydrostatic pumps driven by a prime mover. The linkage assembly includes a pair of first linkage systems pivotally interconnecting the control lever to each respective output control arm for effecting equivalent displacement of the control arms upon pivotal movement of the control lever. A pair of independent throttling members are mounted for rotational movement about respective axes, with each throttling member including a guide which is generally perpendicular to its respective axis of rotation. A follower is moved along each guide by equivalent amounts proportional to the pivotal displacement of the control lever by a displacement means. A pair of second linkage systems interconnect each respective follower to a respective first linkage system, such that rotation of a throttling member varies the output of an associated pump without affecting the output of the other pump.

In the disclosed embodiment, the operator control lever includes a bell crank, with each arm of the bell crank having a respective first and second cross-bar rigidly connected thereto and extending outwardly away from each side thereof. The pair of first linkage systems includes respective rocker arms pivotally mounted to the opposed ends of a first cross-bar, with a respective connector link being pivotally interconnected between a respective output control arm of the power sources and a respective rocker arm. The pair of second linkage systems includes a respective follower link pivotally mounted to a respective rocker arm and to a respective follower. The follower link includes an elongated slot receiving the second of the cross-bars, accommodating movement of each follower link, rocker arm, and connector link independently of the other set of such members.

Broadly, the method includes manually pivoting the single operator lever. In response to that step, the pair of output regulators on the hydraulic pumps are equivalently displaced to achieve equivalent power output from the two pumps. Simultaneously, the pair of independent followers are equivalently displaced along the guides. To steer the prime mover, one of the throttling members is pivoted to displace the respective follower along an arcuate path. As a result, a respective output control arm is displaced to vary the power output from one of the pumps without affecting the output of the other pump, by virtue of the linkage system.

Accordingly, the present invention enables the use of a single operating control lever and two steering pedals, without encountering the previously enumerated and discussed prior art problems.

These and other meritorious features and advantages will be more fully appreciated from the following detailed description and the appended claims.

DETAILED DESCRIPTION OF THE PREFERRED EMBODIMENT

Figure 2:
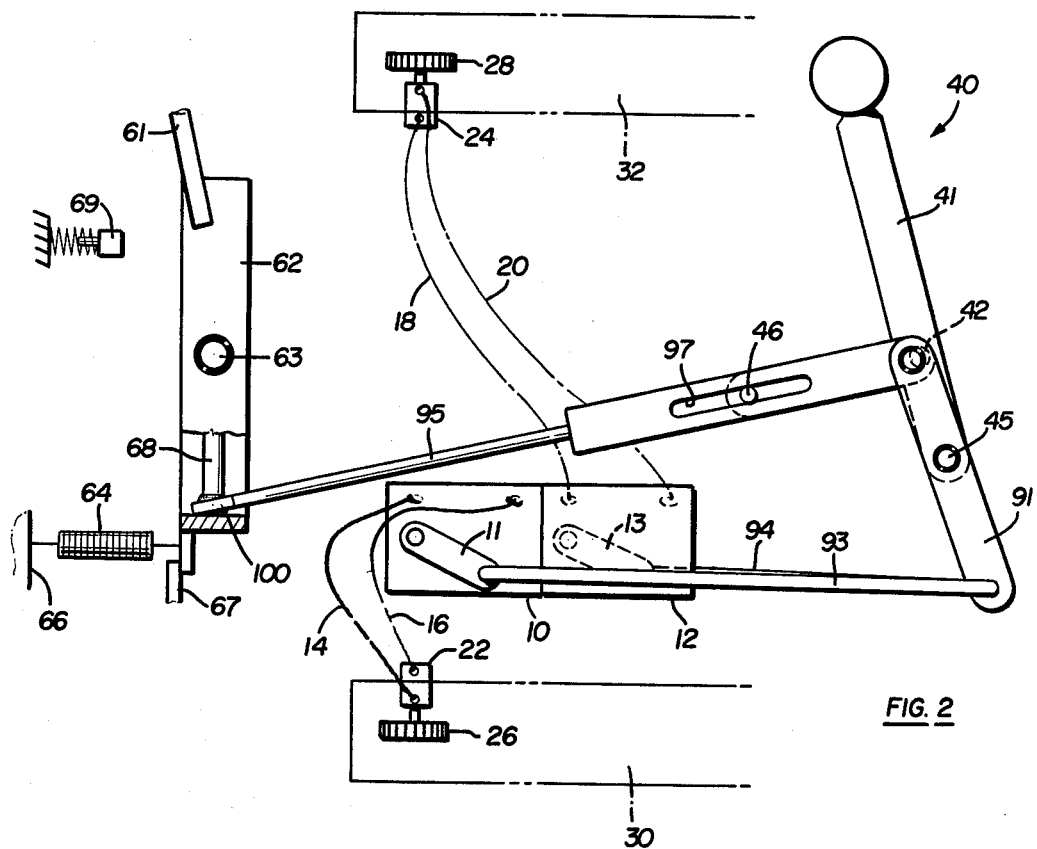
FIG. 2 is a side elevational view of the linkage system, illustrating the manner of displacing the single operator control lever to achieve equivalent power output from the two independent power sources.

The present invention relates to a method and apparatus for regulating a power system in an actuated device of the type having a pair of independent output shafts, such as crawler tractors of "skid-steer" tractors. As shown in FIG. 2,, such a power system includes a pair of variable output tandem hydraulic swash-plate type pumps 10 and 12, which are conventionally connected to a prime mover or engine (not shown). The output from each of the pumps is regulated by respective output control regulators 11 and 13. Hydraulic output from the pumps is respectively through a pair of hydraulic circuits 14,16 and 18,20 which are connected to conventional motors 22 and 24 for driving the output components of the generated device which in the preferred embodiment include drive sprockets 28 and 30 and chain tracks 32 and 34 for a crawler tractor.

In general, the proposed assembly for regulating the output from the pumps 10 and 12 includes a single, hand-operated speed control lever 40, a foot-controlled steering pedal arrangement 50, and a pair of linkage systems interconnecting the lever 40 and the pedal assembly 50.

More specifically, the speed control lever includes an elongated, generally vertical member 41 which is rigidly connected to a stationary rotatable shaft 42. The lever includes a bell crank comprising a vertical arm 43 and a horizontal arm 44. Further, the control lever includes first and second respective cross-bars 45 and 46 which are rigidly secured to the ends of arms 43 and 44, with each of the cross-bars extending outwardly from each side of the arms in a direction generally parallel to the pivot axis of pin 42 for a purpose to be more fully explained later.

Generally, the steering assembly includes laterally spaced left and right foot steering pedals 60 and 70 which may be individually depressed by an operator to appropriately steer the prime mover. Additionally, a central pedal 80 is provided to serve as an alternative means for equally reducing the power output from each of the tandem pumps 10 and 12. This pedal includes a generally vertical rod 81 and a horizontal cross-bar 83, the vertical rod 81 being pivotally mounted on a rotational bearing shaft 82. As will become apparent from later portions of the disclosure, when pedal 80 is depressed, cross-member 83 engages portions of steering assemblies 60 and 70 to equivalently depress those members.

Each of the steering pedals 60 and 70 are essentially mirror images of one another and, in essence, constitute throttling members or power reducing members. Since each of these members is identical, their description will be primarily devoted to pedal assembly 60, with like numerals of pedal assembly 70 indicating identical parts.

Figure 3:
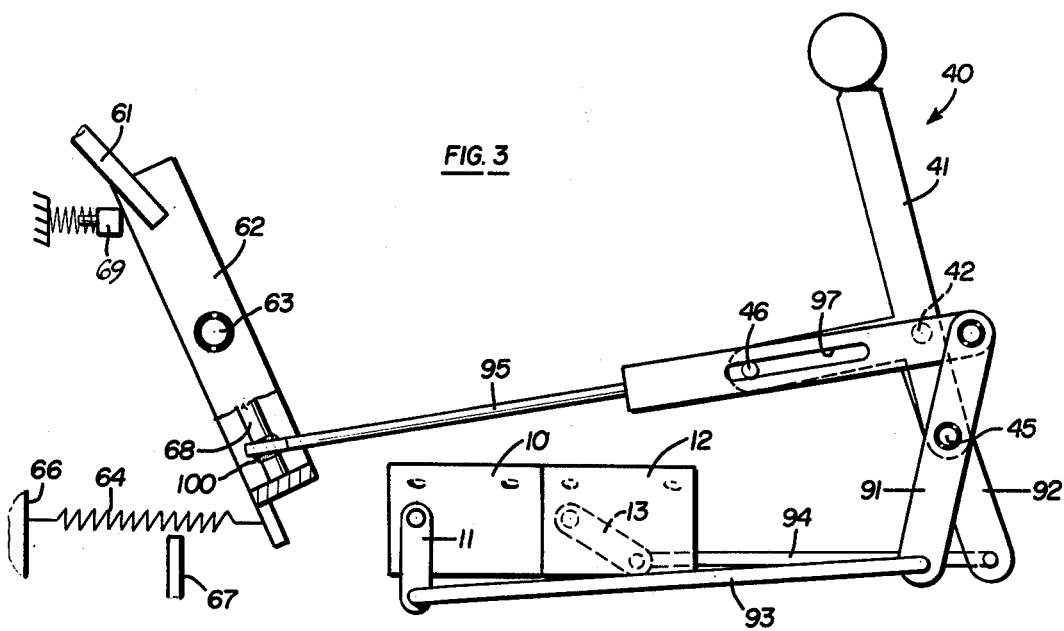
FIG. 3 is a side elevational view similar to FIG. 2, but illustrating the manner of reducing the power output from one of the hydraulic pumps by depressing a foot-operated steering pedal.

More specifically, pedal assembly 60 includes a generally vertical rod 61 interconnected with a C-shaped frame member 62 which is rotationally mounted on a bearing shaft 63. A tension spring 64 interconnected between a spaced support surface 66 and a depending tab 65 on the C-shaped frame 63 maintains the pedal 60 in the position shown in FIG. 1 so that the tab 65 is against an abuttment 67. A generally vertical, cylindrical guide 68 extends between the legs of the C-shaped frame for a purpose which will also be more fully discussed later. Finally, as shown in FIGS. 2 and 3, an abutment 69 is spring biased by a compression spring to limit the rotational movement of the C-shaped frame 62 when pedal 60 is moderately depressed by an operator. As will be discussed in greater detail below, the biasing force of the compression spring may be overcome, if desired, to achieve counter rotation of the tracks 30 and 32.

The linkage assemblies include a pair of laterally spaced rocker arms 91 and 92, which are rotationally mounted on opposed ends of cross-bar 45. Connector links 93 and 94 are pivotally interconnected between respective output control arms and rocker arms 11,91 and 13,92. Respective follower links 95 and 96 are pivotally connected to the upper ends of rocker arms 91 and 92. As shown, each of these arms respectively include elongated slots 97 and 98 which receive the opposed ends of cross-bar member 46.

Respective spherical steel ball followers 100 and 101 are slidably received on the respective cylindrical guides 68 and 78 and are molded into respective follower links 95 and 96. Such steel ball followers may be obtained commercially, for example, under the trademark Unibal.

Figure 1:
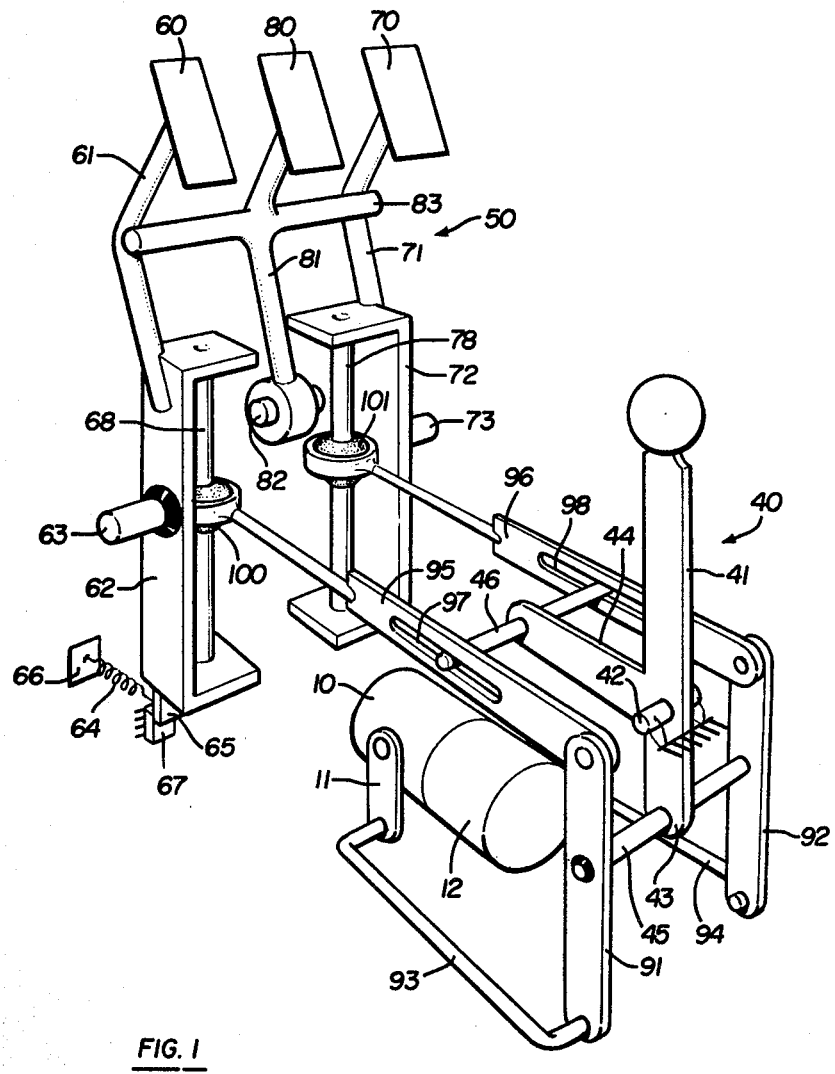
FIG. 1 is an overall perspective of the linkage control system of the present invention.

In operation, the speed control lever 40 is vertically positioned as shown in FIG. 1 when the hydrostatic tandem pumps are in an idle condition. Likewise, output control regulators 11 and 13 are vertical, as are rocker arms 91 and 92. Likewise, connector links 93 and 94 are in a horizontal position, as are follower links 95 and 96 and arm 44 of the bell crank. Thus, followers 100 and 101 are positioned at the pivotal axis of the C-shaped frames of the pedal assemblies.

When it is desired to drive the operated device in a reverse direction, the operator lever is manually pivoted in a clockwise direction, as viewed in the Figures of this application. Conversely, when it is desired to drive the actuated device in a forward direction the operator control lever 41 is pivoted in a counter-clockwise direction, as shown in FIGS. 2 and 3.

FIG. 2 illustrates the method where the operator control lever is pivoted to an extreme position to achieve full-output from both of the hydraulic pumps 10 and 12. As a result of the counter-clockwise pivotal movement of the control lever 41, cross-bar member 46 is displaced along an arc, displacing follower links 95 and 96 downwardly to position followers 100 and 101 at the bottom of guides 68 and 78. Likewise, arm 43 of the bell-crank is pivoted so that cross-bar member 45 is displaced along an arc to a position of FIG. 2. As a result, rocker arms 91 and 92 are pivoted, causing displacement of connector links 93 and 94 to equivalently pivot output control arms 11 and 13.

When it is desired to steer the prime mover, the operator will depress either pedal 60 or 70 for left or right steering. FIG. 3 illustrates the condition when left pedal 60 has been depressed so that C-shaped frame 62 engages stop 69. As a result, output control regulator 11 is returned to its idle position for reasons explained below and rotation of output sprocket 26 is discontinued. As will be apparent, if only slightly reduced output from a pump is desired, then the pedal 60 or 70 will be depressed to a position between that shown in FIGS. 2 and 3.

As shown by FIG. 3, when foot pedal 60 is depressed, C-shaped frame and guide 68 are rotated in a counter-clockwise manner. Follower 100 is therefore displaced along an arcuate path, causing follower link 95 to be displaced to the position shown. Due to the slot 97, cross-bar member 46 remains stationary and follower link 96 remains in position so that the output from pump 12 is undisturbed. Since control lever 41 remains in position during depression of the foot pedal 60, the cross-bar member 45 remains in position and rocker link 91 is rotated in a clockwise direction. This causes connector link and output control regulator 11 to be returned to their position of FIG. 1.

When it becomes desirable to discontinue the reduced power output from pump 10, the operator will release foot pedal 60, which will be returned to its position of FIG. 1 by virtue of the tension spring 64.

As will be appreciated, when the operator control lever 41 is pivoted for reverse drive, the following will occur. Arm 44 and cross-bar 46 will be raised, causing similar displacement of follower links 95 and 96 to displace followers 100 and 101 upwardly along guides 68 and 78. Similarly, cross-bar 45 will be displaced along a clockwise arc, causing clockwise pivotal movement of rocker arms 91 and 92. Connector links 93 and 94 are therefore displaced toward pedal assemblies 60 and 70 to pivot output control regulators 11 and 13 in a clockwise manner, as viewed in the Figures.

When foot-pedal 60 is depressed during reverse drive, follower 100 is displaced along a counter clockwise arcuate path. This displaces follower link 95 toward the pedal assembly 60, causing counter-clockwise pivotal movement of rocker arm 91. Thus, connector link 93 and control output regulator 11 are returned to their initial position, if pedal 60 is depressed to the position for engaging, without depressing, abutment 69.

As described previously, foot pedal 80 may be depressed to effect a simultaneous depression of pedals 60 and 70 to equivalently reduce the output from pumps 10 and 12.

Figure 4:
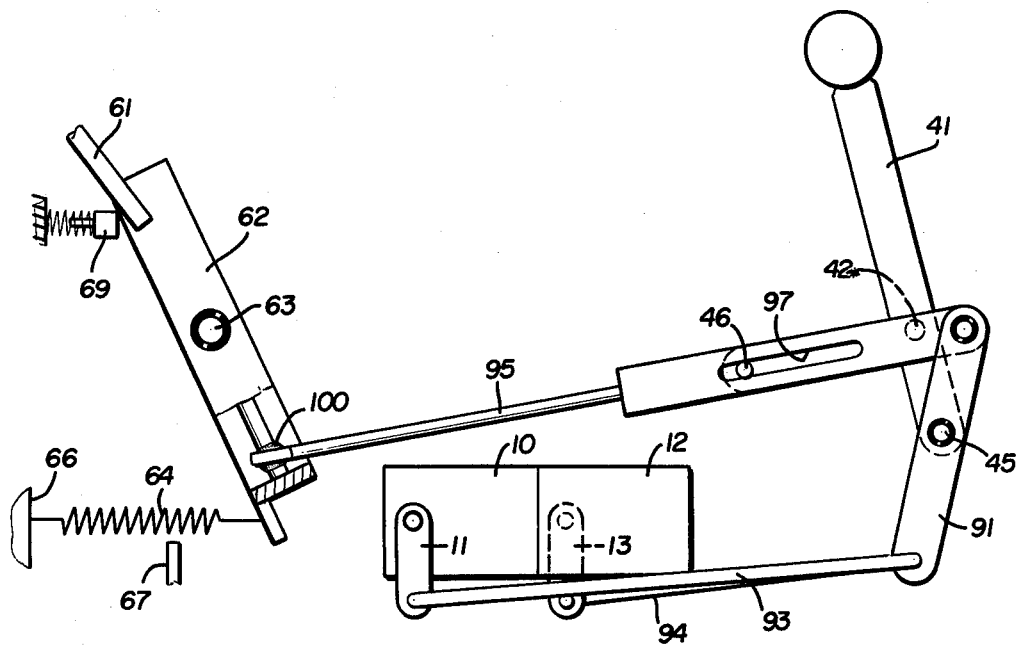
FIGS. 4 and 5 are side elevational views similar to FIGS. 2 and 3, but illustrating a manner of achieving counter rotation of the output components of the actuated device.
Figure 5:
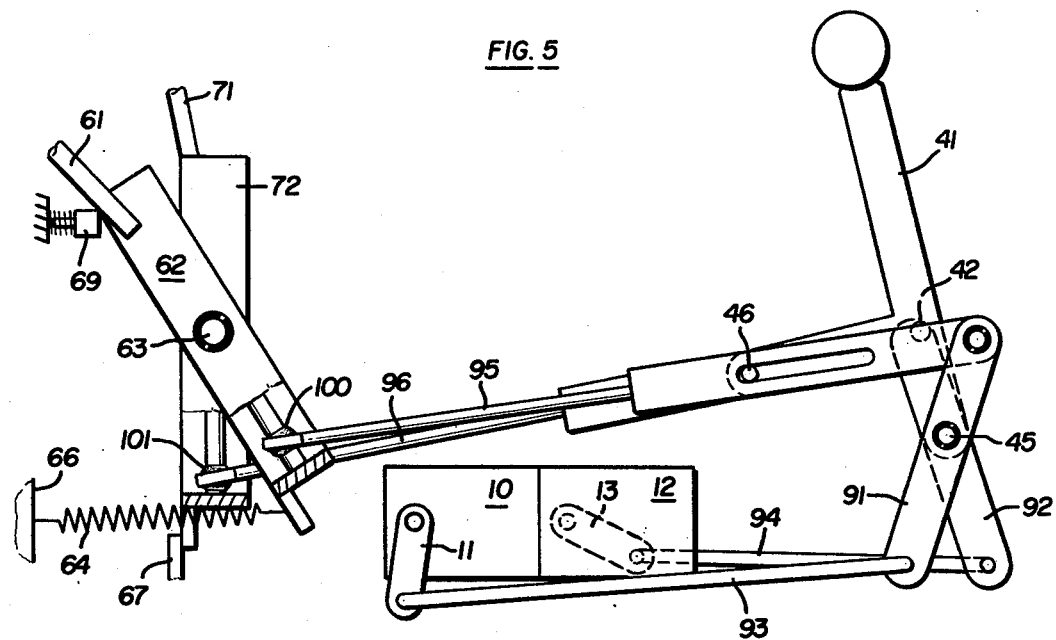

FIGS. 4 and 5 illustrate one manner of counter rotating the drive members of the operated device. Accordinging to this method, both foot pedals are depressed to a position where the C-shaped frame members 62 and 72 engage their respective abutments, without depressing the abutments against the biasing force of their associated compression springs. Also, control lever 41 is pivoted either forwardly or rearwardly with the net results being shown in FIG. 4. That is, the output of both pumps is in an idle position. Next, as shown in FIG. 5, foot pedal 60 is depressed further to displace the abutment 69. Simultaneously, foot pedal 70 is released. As a result, output control arm 11 is displaced from idle to achieve clockwise rotation. Simultaneously output control arm 13 is displaced from idle to achieve counter clockwise rotation because the followers 100 and 101 are located below the pivot axes 63 and 73, such that the arm 95 is moved to the right and the arm 96 is moved to the left as shown in FIGS. 4 and 5.

Other modes of operation will be apparent to those skilled in the art. Further, although the present invention is described as being utilized in an embodiment for regulating the output from a pair of hydraulic pumps, it is to be understood that this description is exemplary in nature only. The invention is readily adaptable for regulating the power output from any other power source, such as a variable output hydraulic motor. Additionally, other modifications may be included, such as providing an appropriate interlock to prevent depressing both foot pedals simultaneously into the override position, if desired.

Accordingly, it will be understood that the invention is limited only by the appended claims and their legal equivalents.

Having therefore fully and completely described our invention, we now claim:

1. A mechanical linkage system for independently regulating the power output from a pair of independently operable, variable power sources, with said power sources having respective displaceable output control regulators, comprising:
    a single, pivotally mounted speed control lever;
    a pair of first linkage means interconnecting said speed control lever with a respective output control regulator for equally displacing said regulators upon pivotal movement of said speed control lever to obtain equivalent power output from each of said power sources;
    a pair of independently movable power reducing members; and
    a pair of second linkage means respectively interconnecting each power reducing member with one of said first linkage means for independently varying the output of one of said power sources upon independent movement of one of said power reducing members, without moving the control lever and without varying the output of the other power source.

2. The linkage system as defined in claim 1, wherein each of said first linkage means includes (a) a rocker link pivotally interconnected with the control lever and (b) an elongated output control transmitting link pivotally interconnected with both a respective rocker link and a control regulator.

3. The linkage system as defined in claim 1, wherein the power reducing members are rotationally mounted about a common axis and each includes a guide generally perpendicular to said axis, each of said second linkage means including (a) a follower displaceable along said guide away from said axis in response to pivotal movement of the control lever and (b) an elongated follower link interconnecting a respective follower with a respective first linkage means, such that rotation of a power reducing member independently of the other such member independently varies the power output from one of the power sources by displacing the associated follower link and first linkage means independently of the other such members.

4. The linkage system as defined in claim 2, wherein the power reducing members are rotationally mounted about a common axis and each includes a guide generally perpendicular to said axis;
    each of said second linkage members including a follower displaceable along said guide in response to pivotal movement of the control lever and an elongated follower link interconnecting a respective follower with a respective rocker link, such that rotation of a power reducing member independently of the other such member independently varies the power output from one of the power sources by displacing the associated follower link, rocker link, and transmitting link independently of the other such members.

5. The linkage system as defined in claim 4, wherein the control lever is comprised of (a) a bell crank, (b) a first cross bar rigidly connected to one arm of the bell crank and (c) a second cross bar rigidly connected to the other arm of the bell crank, with each cross bar extending outwardly away from each side of the respective arms in a direction generally parallel to the pivotal mounting axis of the control lever;
    said rocker links being pivotally interconnected to opposed ends of the first cross bar; and
    each of said follower links including a slot along its elongated axis, receiving said second cross bar and accomodating movement of each follower link relative to the other.

6. In an actuated device which includes a single, pivotally mounted operator control lever and a pair of tandem hydrostatic pumps having respective, displaceable output control arms, the improvement of:
    a pair of first linkage systems pivotally interconnecting the control lever to each respective output control arm for effecting equivalent displacement of the output control arms upon pivotal movement of the single operator control lever;
    a pair of independent throttling members mounted for rotational movement and each including a guide generally perpendicular to the axes of rotation;
    a respective follower movable along each guide;
    means for displacing said followers along the guide away from the rotational axes by equivalent amounts proportional to pivotal displacement of the control lever, the followers being alternatively movable in both directions away from the axes in response to the direction of pivotal movement of the control lever to achieve either forward or reverse drive of the actuated device; and
    a pair of second linkage systems interconnecting each respective follower to a respective first linkage system, such that rotation of a throttling member varies the output of an associated pump without affecting the output of the other pump.

7. The apparatus as defined in claim 6, wherein the means for displacing the followers includes a cross bar on the control lever received in a slot in each of said second linkage systems, with the slot permitting displacement of the second linkage system relative to the cross bar so that the output from the pumps may be independently varied by the throttling members.

8. In an actuated device, such as a crawler tractor, skid-steer tractor or the like which includes a pair of independently operated hydraulic power sources, each such power source having a respective, pivotally mounted output control arm, the improvement of:

- an elongated, vertical speed cotrol lever pivotally mounted about a horizontal axis intermediate the two ends of the lever;
- a first cross bar rigidly connected to the lower end of the lever and extending outwardly away from each side of the lever in a direction generally parallel to said horizontal mounting axis;
- a respective, generally vertical, elongated linkage member rotationally mounted to each end of the cross bar on opposed sides of the lever for pivotal movement about the elongated axis of the cross bar, with the point of connection to the cross bar being intermediate the ends of each linkage member;
- a respective, generally horizontal connector link pivotally connected to and interconnecting each output control arm of the power sources with the lower portion of a respective vertical linkage member, such that pivotal movement of the speed control lever achieves equivalent power output from the power sources;
- a generally horizontal arm rigidly connected to the control lever and having an axis generally perpendicular to the lever pivot axis, with a second cross bar being rigidly connected to the opposed end of the arm and extending outwardly away from each side of the arm along an axis generally parallel to the lever pivot axis;
- a follower link pivotally mounted to the upper end of each respective linkage member, each follower link (a) extending in a direction parallel to the horizontal arm, (b) including an elongated slot receiving the second cross bar, and (c) terminating in a follower member; and
- a pair of throttling members independently pivotally mounted about a common horizontal axis which is generally parallel to the horizontal lever axis, each throttling member including a generally vertical guide which receives a respective follower member, the follower members being equally displaced from a neutral position on the common horizontal axis when the control lever is pivoted from an idling position; such that upon pivotal movement of one of the throttling members, the follower link is displaced along an axis perpendicular to the axis of the second cross bar, with the follower link moving relative to the second cross bar as a result of said slot, with the displacement of said follower link pivoting the respective linkage member on the first cross bar, causing displacement of the respective connector link to pivot the respective control arm and vary the output from the respective power source independently of the other power source.

9. In a method of varying the power output from two hydraulic pumps which include respective output regulators that are displaced equivalently by a single operator control lever, the steps of:

(1) in response to movement of the operator control lever, simultaneously (a) equivalently displacing the output regulators to achieve equivalent power output from the two pumps and (b) equivalently displacing a pair of independent followers along respective guides which are pivotally mounted about respective axes perpendicular to each respective guide;

(2) pivoting one of said guides to displace the respective follower along an essentially arcuate path; and (3) in response to Step (2), displacing one of said output regulators without displacing the other output regulator in order to achieve dissimilar outputs of power from the two pumps.

10. An actuated device steered by the method of;

(a) manually pivoting a single operator lever;

(b) in response to Step (a), simultaneously (1) equivalently displacing a pair of output regulators on respective hydraulic pumps to achieve equivalent power output from the two pumps and (2) equivalently displacing a pair of independent followers along respective guides which are pivotally mounted about respective axes essentially perpendicular to each respective guide;

(c) manually pivoting one of said guides to displace the respective follower along an essentially arcuate path; and (d) in response to Step (c) displacing one of said output regulators without displacing the other output regulator in order to achieve dissimilar outputs of power from the two pumps.

11. In a method of counter rotating the output shafts in an actuated device which includes a pair of independently operable, variable power sources functionally interconnected with said shafts, wherein the output of said power sources is controlled by respective output control arms, the method of:

(a) substantially simultaneously and substantially equivalently pivoting a pair of guides about their respective pivotal axis from respective intial position to engage respective abutments, such guides each including an elongated guideway essentially perpendicular to its pivotal axis, and further including a respective follower displaceable along each guideway;

(b) manually pivoting a single operator control lever away from an idle position;

(c) in response to Step (b), equivalently displacing said followers along the respective guideways and maintaining the output control arms at their respective idle position by virtue of respective linkage systems interconnected between the control arms and a respective follower;

(d) pivoting one guide back to its original position while pivoting the other guide in the opposite direction against a biasing force applied to the abutment associated therewith; and (e) in response to Step (d) oppositely displacing the control arms to achieve counter rotation of the output shafts.

* * * * *